Figure 27:
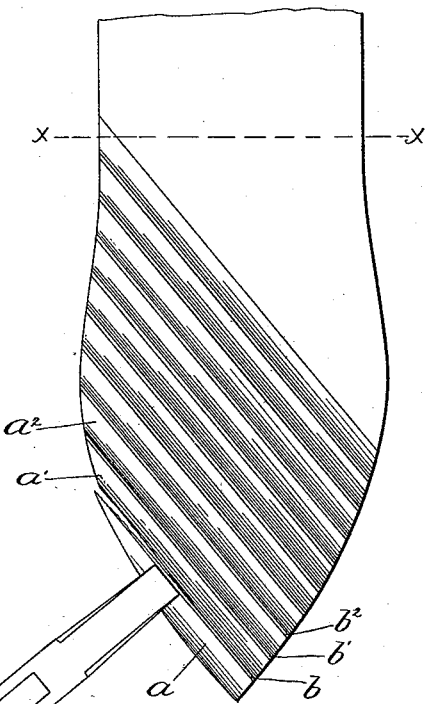

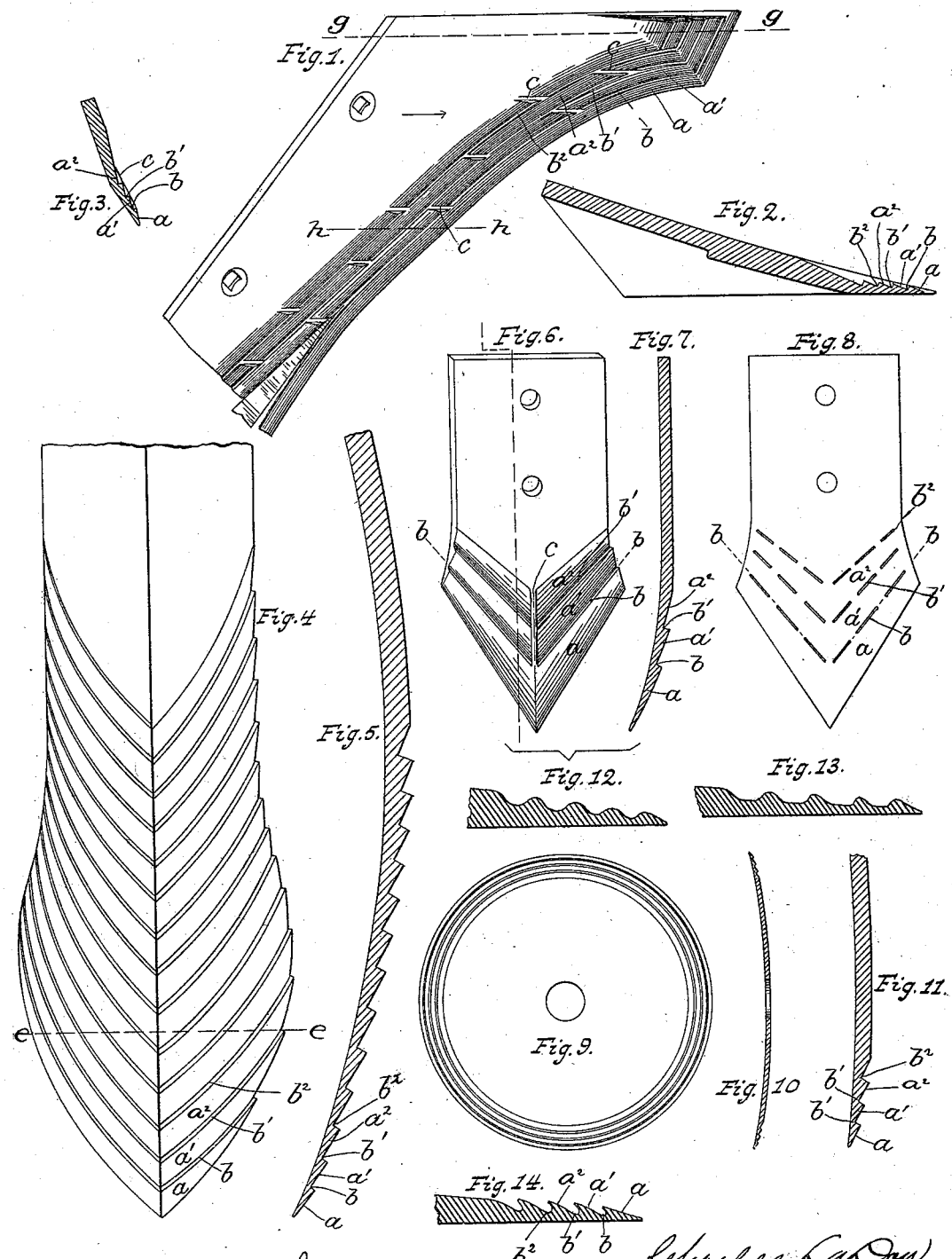

(No Model.) 4 Sheets—Sheet 2.
C. LA DOW.
SHARPENING HARROWS OR OTHER IMPLEMENTS.
No. 539,755. Patented May 21, 1895.
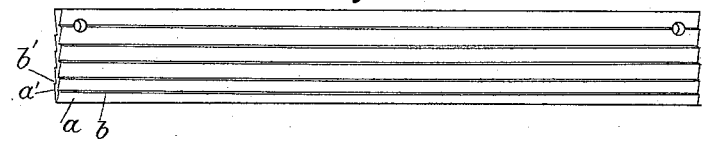
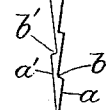
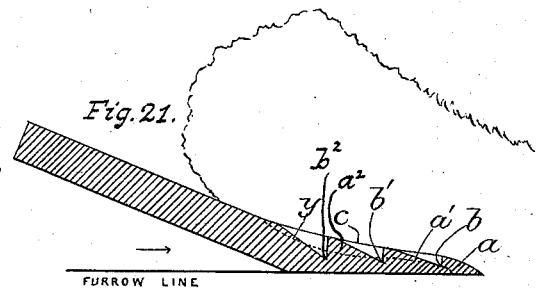
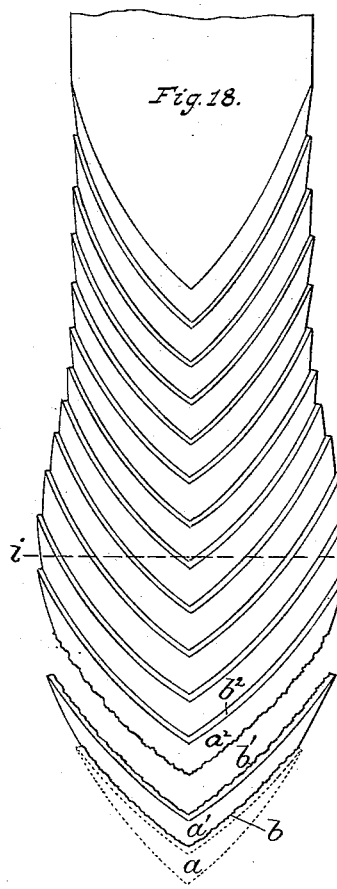
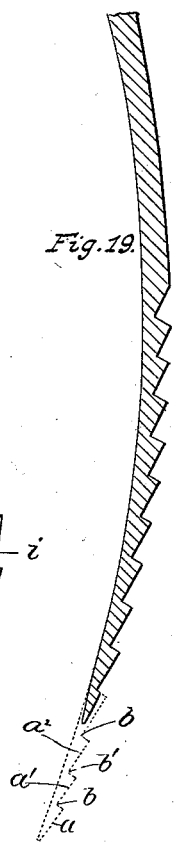
Witnesses: Charles LaDow
Inventor.

(No Model.) 4 Sheets—Sheet 3.
C. LA DOW.
SHARPENING HARROWS OR OTHER IMPLEMENTS.
No. 539,755. Patented May 21, 1895.
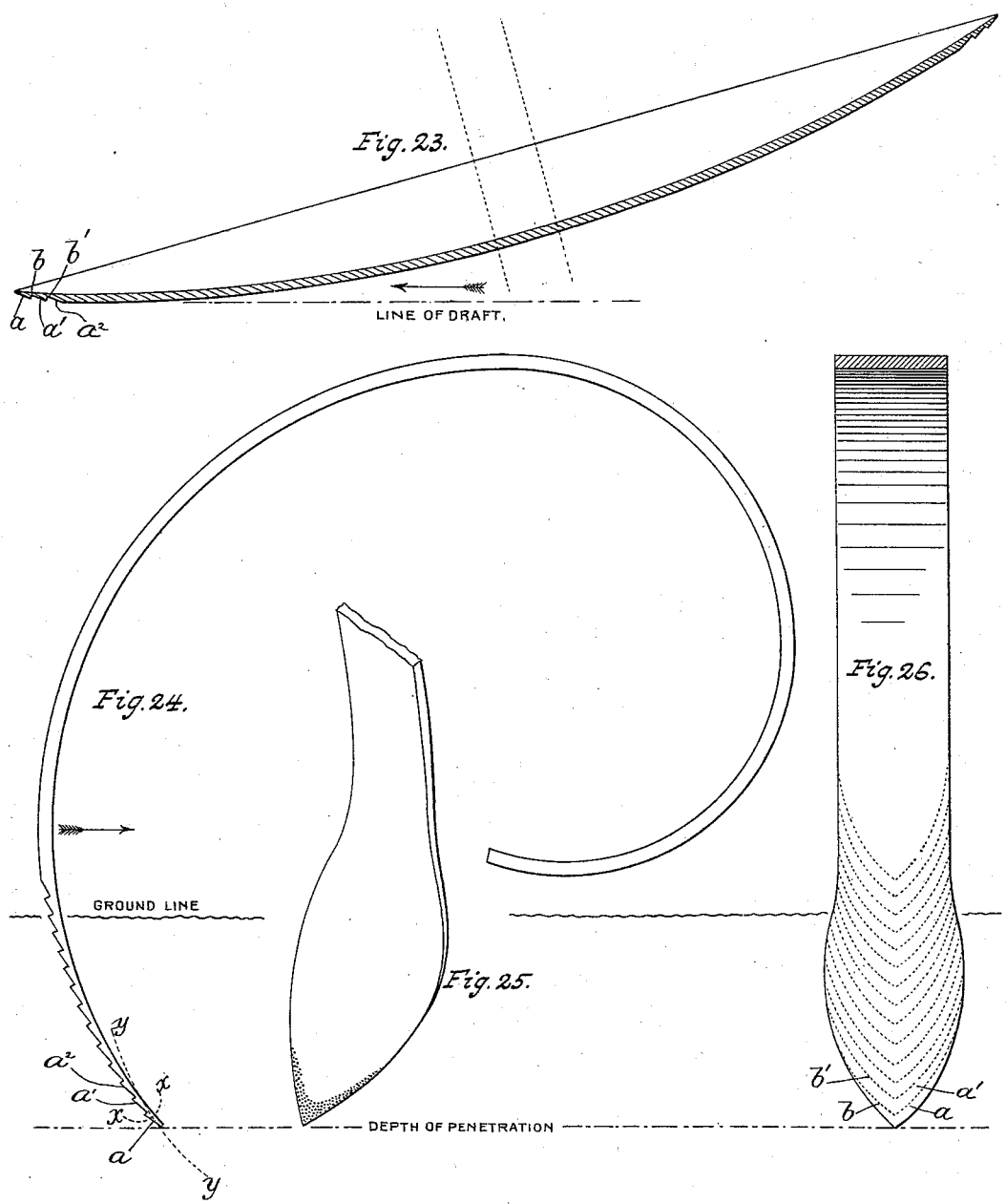

(No Model.) 4 Sheets—Sheet 4.
C. LA DOW.
SHARPENING HARROWS OR OTHER IMPLEMENTS.
No. 539,755. Patented May 21, 1895.

Witnesses
Charles LaDow
Inventor

UNITED STATES PATENT OFFICE.

CHARLES LA DOW, OF ALBANY, NEW YORK.

SHARPENING HARROWS OR OTHER IMPLEMENTS.

SPECIFICATION forming part of Letters Patent No. 539,755, dated May 21, 1895.

Application filed March 30, 1895. Serial No. 543,888. (No model.)

*To all whom it may concern:*

Be it known that I, CHARLES LA DOW, a citizen of the United States, residing at Albany, in the county of Albany and State of New York, have invented a new and useful Art of and Means for Reproducing the Working-Edges of Agricultural or other Implements, of which the following is a specification.

This invention comprises a novel construction of agricultural and other implements, and an art or mode of maintaining or renewing the working edges, points, or members thereof. The implements, whatever be their form or character in other respects, comprise a main body portion, as a blade, tooth, or the like, provided with an exposed primary or initial working edge, point, or member, a following substitute working edge, point, or member, and an intervening weakening element. A characteristic feature of the construction is the outlining in one and the same implement, blade, or part of a rudimentary substitute cutter, one or more, which is normally protected by the outermost or initial cutter or member, but which may be exposed and brought into use as the active working portion, through the wearing away or removal of such outer cutter or member. The outlining of the substitute cutters may be by means of grooves, by alternate elevations and depressions, or by any other suitable weakening element, and any of these weakening elements may be variously arranged as to direction, form and position, as suggested or required by the contemplated use. Within these general limits, the structure is susceptible of numerous variations, some of which will be hereinafter explained.

The art of maintaining or renewing the working portions of an implement comprises essentially two steps or operations: first, the formation of an initial working edge, point, or member and a substitute working edge, point, or member in one and the same blade, tooth, or implement, with an intervening weakening element, and, second, wearing away the initial member and thereby exposing the substitute member. As further refinements of the art thus broadly stated, I may also, by properly fashioning the substitute cutters, determine the relative rates of edge and face wear, and the rate of wear at different points in the edge and in the face, thereby better insuring the preservation of any predetermined outline, and the successive presentation or exposure of the substitute working members. In practice it is preferred to wear away the members successively, by contact with the substance operated upon, though the invention is not restricted thereto.

The invention may be best explained in connection with the accompanying drawings, wherein—

Figure 28:
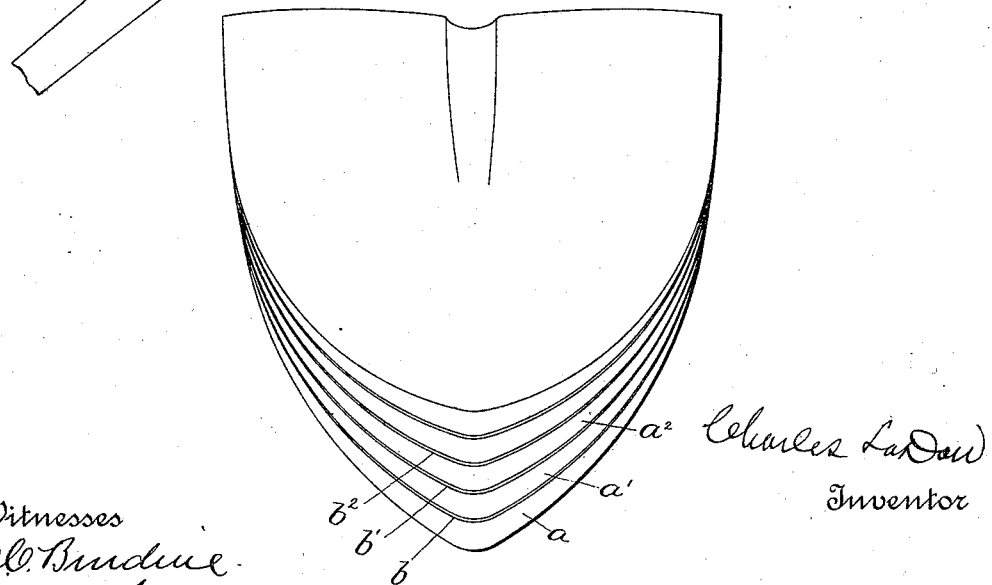

Figure 1 is a top plan or face view of a plow-point embodying my invention; Fig. 2, a transverse sectional view of the same on the line $g\ g$ of Fig. 1; Fig. 3, a similar section on the line $h\ h$ of Fig. 1; Fig. 4, a rear face view, and Fig. 5 a longitudinal sectional view, of the point of a spring harrow-tooth; Fig. 6, a rear face view, and Fig. 7 a longitudinal sectional view, of a cultivator blade or shovel embodying my invention; Fig. 8, a face view of a blade or shovel in which the cutters are outlined by perforations or incisions; Fig. 9, a rear face view, and Fig. 10 a sectional view, of a disk suitable for cultivators, harrows, and like machines, showing the application of my invention thereto; Fig. 11, an enlargement of a portion of Fig. 10; Figs. 12, 13, and 14, sectional views illustrating implements embodying the invention in varying forms; Figs. 15 and 16, respectively, face and edge views of a trailing colter suitable for use in connection with harrows; Fig. 17, an end view of the same; Fig. 18, a rear face view of the point or blade of a spring harrow-tooth or equivalent implement, illustrating the manner in which the implement wears away and drops off the worn-out portions, thus exposing and completing the rudimentary cutter following; Fig. 19, a longitudinal sectional view of the same, indicating the manner in which the implement wears away to expose and perfect successive substitute members. Fig. 20 is a cross-section on the line $i\ i$ of Fig. 18; Fig. 21, a sectional view of a plow-point, such as is shown in Figs. 1 and 2, illustrating the manner in which it wears away and produces successive cutting-edges; Figs. 22 and 22ª, rear and front face views of a harrow-tooth of another form containing the invention; Fig. 23, a diagrammatic view illustrating the mode of using a disk provided with the substitute working members, and the disk being sectioned and viewed from above; Fig. 24, a diagrammatic illustration of a spring harrow-tooth in use, showing the nature and effect of wear which takes place in such use; Fig. 25, a perspective view of the point of such a tooth, showing the nature of the face wear thereof; Fig. 26, a face view of such a tooth, indicating the depth of penetration; Figs. 27 and 28, rear face views of implements, respectively, showing the rudimentary working members arranged in straight lines diagonal to the line of penetration and in curved lines.

Referring first to Figs. 1, 2, 3 and 21, it will be seen that the implement, in this case a plow point, is formed with a beveled outer edge or marginal cutter $a$, behind or within which are outlined substitute working members or cutters $a'$, $a^2$. The outlining of the substitute edges is here effected by producing in the upper face of the implement a series of parallel grooves, depressions, or lines of relative weakness, $b$, $b'$, $b^2$, as shown in said Figs. 1, 2, 3 and 21. By making the grooves or depressions of increasing depth toward the outer cutting boundaries of the implement, the substitute working members $a'$ $a^2$ are made of approximately the same form in cross section as the initial cutter or member $a$. The body of the implement, or that portion intervening between the bottoms of the grooves and the opposite face of the implement, is advisably made of increasing thickness from the outer cutting boundaries inward, so that sufficient strength shall be afforded for the initial and substitute cutters, not only in the first instance but as the body wears away.

Referring now to Fig. 21, $y$ indicates the line of abrasion or wear of the upper face. It will readily be understood that when said implement moves forward through the soil in the direction indicated by arrow, the extreme forward edge will receive the full impact incident to penetration, while the upper face will be subjected to a grinding or abrading action due to the working of the soil over it. This tends to wear away the upper face quite rapidly, particularly at and immediately adjacent to the forward edge, and decreasing thence inward. As a consequence, the outermost cutting member or rib $a$ is gradually worn away at the edge and on the upper face, maintaining all the time a thin and sharp cutting edge.

There is, of course, a certain amount of wear on the under face of the implement, but this is relatively slight, owing to the smoothness of the face, and to the fact that it lies directly in the plane of advance, and not at an angle thereto, as does the inclined upper face.

It may sometimes happen that a working edge $a$ will wear unevenly, or become nicked or broken, so that it will not work satisfactorily, in which case the outer rib, cutter, or member may be removed through the use of a cold chisel, as indicated in Fig. 1, or it may be broken off with pinchers or other suitable tool,—the groove $b$ or $b'$ facilitating the removal, and also determining the line of separation, and form of the substitute.

As the soil works over all substitute or rudimentary cutters or working members $a'$, $a^2$, &c., whenever the implement is in use, it will be seen that the cutters or members farther inward receive a greater aggregate wear than those nearer the boundaries or working edges. It is therefore desirable to make the successive grooves $b$, $b'$, &c., of increasing depth, progressively inward from the edge, as illustrated in Fig. 21, so that by the time a given member or cutter $a'$, $a^2$, &c., is exposed and made the active cutter, it shall have been reduced to approximately the same thickness as the initial cutter first possessed. The principle thus explained, or the mode of reproducing the cutting or working edge and maintaining its desired form and dimensions, at least approximately, is involved more or less fully in all the embodiments of my invention here illustrated.

Next referring to Figs. 4 and 5, it will be observed that the rudimentary or substitute cutters are formed in the rear instead of the front face of the implement, speaking with reference to the direction of advance. In this case, the face of the implement, (which may be a spring harrow tooth, a cultivator blade or shovel, or the like,) is presented much more squarely to the soil than is the plow point, and it is important that the front face be smooth and free from obstructions or irregularities of any kind. In this, as in the plow point, the extreme point of the blade or shovel receives the greatest wear, as it receives the full impact of the work and opens the way for the body of the tool. The entire outer edge of the point receives greater wear than the portion inward from such edge, the wear growing gradually less and less toward the medial line of the blade, and upward from the point, as is well illustrated in Figs. 24 and 25. This peculiarity of wear causes a constant thinning of the point, the abrasion being almost wholly on the front face and forward edge of the blade. The line $x-x$, Fig. 24, indicates the line or direction of wear from front to rear at the exposed edge, and the line $y-y$ indicates the face-wise wear, the resultant form being clearly shown. As the face and point thus wear away, the initial cutter $a$ gradually disappears, and a second cutter $a'$ is exposed and brought into active operation, as indicated in Fig. 24; or the web or body becomes so thinned and the initial cutter so reduced that the remnant of said cutter breaks or drops off. If desired, the remnant may be broken off by a sharp blow from a hammer, or by pinchers or other suitable tool, as indicated in Fig. 27.

Figs. 6 and 7 illustrate the same features of construction described in connection with Figs. 1 to 5 inclusive, which therefore, require no further explanation.

It will be seen that if there be a considerable number of the weakening elements, whether grooves, depressions, or other, the implement might be unduly weakened and rendered liable to break off at a point remote from the then working member. This result is quite effectually guarded against by the oblique, diagonal, or curved arrangement of the substitute cutters or working members, as in Figs. 4, 6, 18, 22, 26, 27 and 28. Under all these forms the rudimentary or substitute working members mutually support and sustain each other, crossing the natural line of fracture. This is well illustrated in Figs. 18 and 20, the latter being a section on the line $i$—$i$ of Fig. 18 and showing how the rudimentary working members $a$, $a'$, $a^2$ cross said line and mutually brace the implement against facewise pressure or strains. The substitute cutters or working members, it will be observed, point in the same direction, so as to immediately follow each other as operative substitutes. In some cases, the substitute cutter projects into the initial cutter and braces it, as above explained. When I speak of the cutters as being arranged diagonally, I mean diagonally with reference to the line of draft, or diagonally with reference to the direction of penetration. In some implements this diagonal or oblique arrangement is impracticable or undesirable, as for instance in the plow point shown in Fig. 1. In such cases, and in other, also if desired, strengthening ties $c$ may be employed, extending from one to another of the cutters or working members, as in Figs. 1 and 6. The form and arrangement of these ties may be varied considerably. They may be formed integrally with the implement, or applied thereto, as found expedient in any given case.

In Fig. 8 I have represented the implement as formed with a series of rudimentary cutters or working members $a'$, $a^2$, &c., outlined by slits or incisions $b'$, $b^2$, &c., which may extend into or entirely through the body of the implement, and which form or produce weakening elements between the cutters.

Figs. 9, 10 and 11 illustrate the application of the invention to a circular or disk-shaped implement, detailed explanation of which is deemed unnecessary in view of what has been said.

Figs. 12, 13 and 14 merely illustrate a few of the many different forms that the elevations and depressions may take in practice.

Figs. 15, 16 and 17 differ from others in that they illustrate the alternate depressions and elevations, or in other words, the rudimentary or substitute working members and intervening weakening elements as formed in both faces of the implement instead of in one only. The implement selected for illustration is a trailing colter, and the principle of construction and operation is the same as already explained.

Figs. 18, 19, 20 and 21 have been already sufficiently described.

Figs. 22 and 22ª illustrate the application of the invention to a pointed harrow tooth of V-section. In this the successive working members $a$, $a'$, &c., and intervening depressions or weakening elements $b$, $b'$, &c., are essentially the same as in Figs. 4, 5, 6, 7, 18 and 19, being formed in the rear face of the implement.

The remaining figures have been sufficiently explained, Figs. 27 and 28 merely showing different forms that the substitute working members may take, with a view to bracing or strengthening the implement against working strains.

The implements may be made of iron, steel, or other suitable materials, and may be cast, forged, or otherwise produced. The working members, both initial and substitute, may be produced in the implements by casting, forging, cutting, grinding or otherwise, but are to be present therein before it is applied to use, the natural wear due to contact with the material in or upon which it operates serving or assisting to remove one and expose another cutter as renewal becomes necessary.

The construction set forth and explained enables me to prepare not only the initial working edges, but the substitute working members as well, for efficient work and prolonged wear, whether one or another material be selected, or one or another mode of manufacture be resorted to. When the implements are cast, whether of iron or steel, or of other suitable material, the thinner portions will, if permitted, cool more rapidly than others and chill or harden, so that those portions which are to constitute the entering or dividing edges may be made harder than other portions. So too, if forged or struck up in a die or drop press, those portions which are depressed most, and which constitute the thinner edges of the initial and substitute working members, may, particularly in the case of cold forging, be rendered more dense than the thicker portions, by reason of the greater compression to which they are subjected.

If the weakening elements be formed by grinding or cutting away the metal, or making incisions therein, this will naturally be done while the metal is in a relatively soft condition or before tempering. In subsequently tempering the implement, those portions which are most reduced and which are subsequently to constitute the entering edges of the intial and substitute cutters or working members, may be more readily brought to a proper tempering heat, and more quickly cooled. Hence it is entirely feasible to prepare the entering edges of the substitute as well as the initial cutters or working members to perform their work in a most efficient manner, even though they be not entirely completed in the original production of the implement. My invention comprehends this feature, but is in no sense or degree dependent thereon.

In the foregoing description I have set forth my invention as embodied in agricultural implements, and have illustrated and described such forms as seem best calculated to elucidate the general plan involved. It is, however, to be understood that the invention is not restricted to agricultural implements, but is applicable generally to any and all implements and articles requiring the maintenance, renewal or sharpening of a working point, end, edge, or member.

While the means shown and described for carrying out my invention are simple and efficient, I do not by any means limit myself thereto.

Having thus described my invention, what I claim is—

1. The art of renewing the working edge of an implement, which consists in first forming in a single blade, tooth, or cutter substitute working edges pointing in the same direction, and then wearing away the initial edge to expose a substitute.

2. The art of reproducing the cutting portion of an implement, which consists in causing a wearing away of the initial cutter by contact with the substance operated upon, to expose a previously outlined substitute cutter.

3. The art of reproducing the cutting portion of an implement, which consists in wearing away the initial cutter, dropping off the remnant thereof, and bringing into operation a previously outlined substitute cutter.

4. The art of sharpening an implement, which consists in first forming a weakening element in one face thereof to outline and prepare a substitute cutter integral with the implement; then wearing away the initial cutter to expose the substitute cutter.

5. The art of renewing the working edge of an implement formed of a single piece of metal, which consists in the following steps performed in the order stated: first, forming alternate elevations and depressions upon and in the surface of the implement, thereby outlining substitute cutters; and second, subjecting the implement to a wearing action from the outer edge inward.

6. The art of renewing the working edge of an implement, which consists in forming therein a depression trending in the general direction of the desired outline of the working edge, and increasing in depth toward such edge, and secondly, subjecting the implement so prepared to a facewise wearing, from the outer edge inward; whereby its material is worn along the line of the depression and the thin body previously constituting the bottom of such depression is made to form a new working edge.

7. An implement comprising substitute cutters or working edges definitely outlined in a single blade or tooth, pointing in the same direction whereby, when the implement is subjected to a simultaneous edgewise and surface wear, the surface of each cutter may be thinned by such wear, while its working edge is being worn away.

8. An implement comprising substitute cutters projecting one into another, the inner portion of the initial cutter being joined to the rudimentary edge of the next succeeding cutter.

9. An implement comprising substitute cutters pointing in the same direction, the inner portion of the initial cutter being joined integrally to the rudimentary edge of the next succeeding cutter.

10. An implement comprising diagonally arranged substitute cutters pointing in the same direction, the inner portion of the initial cutter being joined to the rudimentary edge of the next succeeding cutter.

11. An implement comprising beveled substitute cutters, the inner portion of the initial cutter being joined to the rudimentary edge of the next succeeding cutter.

12. An implement comprising substitute cutters each of graduated width, the initial cutter being joined to the rudimentary edge of the next succeeding cutter.

13. An implement comprising substitute cutters outlined by grooves of varying depth, each cutter being joined to the rudimentary edge of the next succeeding cutter.

14. An implement comprising an initial cutter, a substitute cutter, an intervening weakening element; and a strengthening tie connecting the two cutters.

15. An implement increasing in thickness from its outer edge inward, and comprising a series of cutters, the inner portion of the initial cutter being joined to the rudimentary edge of the next succeeding cutter.

16. An implement having a thin wearing body provided with a series of ribs or elevations forming substitute working members, and bracing the body against transverse strain, whereby when the thickness of the implement is reduced by wear, it shall give way between the outermost and next succeeding rib and expose the latter as a substitute cutter or working member.

17. An implement comprising an initial and a substitute cutter outlined therein, and an intervening, weakening element, the initial cutter being joined integrally to the rudimentary edge of the next succeeding cutter.

18. The art of renewing the working edge of an implement, which consists in thinning an integral metal plate or body on a line within its initial cutting edge, thereby outlining a substitute cutter, and hardening or tempering the thinned portion,—and then wearing away the outermost cutter to expose the hardened edge of the substitute cutter.

In testimony whereof I have hereunto subscribed my name.

CHARLES LA DOW.

Witnesses:
WILLIAM W. DODGE,
LLOYD B. WIGHT.